_Patented Feb. 23, 1954_                                                   2,670,342

UNITED STATES PATENT OFFICE 2,670,342

PROCESS FOR VULCANIZING POLYCHLOROPRENE

John J. Verbanc, Wilmington, Del., assignor to E. I. du Pont de Nemours and Company, Wilmington, Del., a corporation of Delaware No Drawing. Application February 7, 1952,
Serial No. 270,503

6 Claims. (Cl. 260—92.3)

This invention relates to a new and improved process for vulcanizing polychloroprene, and more particularly to a process in which a group of compounds prepared by the Mannich reaction, which will be generally referred to as Mannich bases, are employed as the vulcanization accelerators.

The polychloroprenes to which the present invention relates are those compounds commonly known in commerce as "neoprene." Neoprene is a generic name applied to the polymers of 2-chloro-1,3-butadiene (chloroprene), and to copolymers of the same with diene or vinyl compounds such as acrylonitrile, butadiene, isoprene, dichlorobutadiene, and styrene, in which copolymers the chloroprene is the predominant monomer. These polymers (which term is used to include copolymers) may be made in aqueous emulsions and are available today under such names as "Neoprene Type GN," "Neoprene Type W," "Neoprene Type FR," and as latices under type numbers such as Type 571, Type 735, and Type 842, all of which are generally referred to as polychloroprenes or chloroprene polymers.

Polychloroprenes differ greatly from other synthetic rubbers and from natural rubber in the manner in which they can be vulcanized. With most types of polychloroprene, good vulcanizates may be obtained by incorporating certain metal oxides in the plastic polymer and heating to effect vulcanization. However, it is customary to use in conjunction with the metal oxides certain organic accelerators which increase the rate of cure and improve vulcanizate properties. With some types of polychloroprene, such as those made in the presence of aliphatic mercaptans, metal oxides act slowly and do not produce a high state of cure even after long periods of heating. With polychloroprenes of this type, accelerators are necessary for a good cure.

Among the polychloroprene accelerators in current use may be mentioned "NA-22" (ethylene thiourea which may also be referred to as 2-mercaptoimidazoline) and "Permalux" (the di-o-tolylguanidine salt of dicatechol borate). These accelerators, which are in general use on the market today, produce excellent polychloroprene vulcanizates but, because they are so active at relatively low temperatures, care must be exercised to prevent scorching during the vulcanizing process. This problem of scorch is most noticeable in the case of polychloroprenes which are made in the presence of aliphatic mercaptans.

It is therefore an object of the present invention to provide an improved process for the vulcanizing of polychloroprenes in which a new class of vulcanization accelerators is employed, which accelerators are active at ordinary vulcanization temperatures but provide a much wider margin of processing safety than do the accelerators currently used.

I have found that a limited class of compounds prepared by the Mannich reaction, which will be hereinafter referred to as Mannich bases, materially increase the speed of vulcanization of polychloroprene but present less hazard with regard to scorching than do the vulcanization accelerators that are now being used with polychloroprene. The Mannich bases employed in the process of the present invention are those prepared from phenols and naphthols which contain one to three dimethylaminomethyl groups in the positions ortho and para to the hydroxy radical. The phenolic and naphtholic Mannich bases employed in this invention may contain in addition to the dimethylaminomethyl groups one or more substituents in the aromatic ring or rings. These substituents may be alkyl, aralkyl, aryl, alkoxyl, aralkoxyl, amino, alkylamino, acylamido, nitro, halogen or carboxyl groups, the hydrocarbon radicals of such groups when present containing not more than 8 carbon atoms. Although a large number of these phenolic and naphtholic Mannich bases containing a wide variety of substituents have been used, no substituted phenolic or naphtholic Mannich bases have been found which do not exhibit the accelerating effect in the vulcanization of polychloroprene.

The preferred phenolic and naphtholic Mannich bases for use in the present invention are those which contain at least two dimethylaminomethyl groups. The metal salts of these phenolic and naphtholic Mannich bases, and more particularly the light metal salts (those having a density of less than 4, such as Na, K, Ca, Mg and Al) exhibit a high order of accelerating activity and also good scorch-resistance characteristics.

In general the accelerators of this invention are used with from 1% to 8% or more of zinc oxide and preferably also with from 1% to 8% or more of magnesium or other metallic oxide. The Mannich bases are preferably used in an amount of about 0.5% to 3.0% and in general suitable curing temperatures will be found to be between 125° and 205° C. The percentages mentioned above are based on the weight of the polychloroprene. Although the aromatic Mannich bases as above described show activity in the various types of polychloroprene, their use is of particular value with chloroprene polymers which have been produced in the presence of aliphatic mercaptans by processes such as described in U. S. Patent 2,494,087, U. S. Patent 2,573,009, etc.

The following examples are given to illustrate the invention. Parts are given by weight unless otherwise specified.

*Example 1*

Polychloroprene was compounded according to the following formula:

| | Parts |
|---|---|
| Polychloroprene [1] | 100 |
| Phenyl-alpha-naphthylamine | 2 |
| Semi-reinforcing furnace carbon black | 29 |
| Extra light calcined magnesia | 2 |
| Zinc oxide | 5 |
| Accelerator, as shown. | |

[1] In this example, a polychloroprene is used which was prepared by the emulsion polymerization of chloroprene in the presence of a dodecyl mercaptan by the process described in U. S. Patent 2,494,087.

Table I presents a comparison of the phenolic Mannich bases as listed below, with ethylene thiourea and an unaccelerated control. Slabs and pellets of the polymer were cured and tested by standard A. S. T. M. methods.

1. Unaccelerated control
2. Ethylene thiourea
3. 2,4 - di(dimethylaminomethyl) - 6 - methylphenol
4. 2,4,6-tri(dimethylaminomethyl) phenol
5. 2,6-di(dimethylaminomethyl) phenol
6. di(dimethylaminomethyl)-3-methylphenol
7. 2,6 - di(dimethylaminomethyl) - 4 - methylphenol

TABLE I

| | Min. Cure at 153° C. | 1 | 2 (0.5) part | 3 (1.0) part | (2.0) parts | 4 (1.0) part | 5 (1.0) part | 6 (1.0) part | 7 (1.0) part |
|---|---|---|---|---|---|---|---|---|---|
| Stress in p. s. i. at 300% elongation | 10 | 275 | 1,525 | 1,525 | 1,700 | 1,370 | 1,450 | 1,550 | 1,040 |
| | 20 | 850 | 1,750 | 1,775 | 1,725 | 2,000 | 1,900 | 1,850 | 1,625 |
| | 40 | 800 | 1,900 | 2,050 | 1,775 | 2,200 | 2,100 | 2,075 | 1,900 |
| Tensile strength in p. s. i. | 10 | 1,600 | 3,875 | 3,900 | 3,575 | 3,625 | 3,825 | 3,500 | 3,575 |
| | 20 | 3,100 | 3,875 | 3,675 | 3,600 | 3,625 | 3,925 | 3,600 | 3,875 |
| | 40 | 3,000 | 3,600 | 3,700 | 3,775 | 3,700 | 3,850 | 3,525 | 3,800 |
| Percent Compression Set (70 Hr. at 100° C.) | 25 | 63 | 22-25 | 21 | 11 | 25 | (¹) | 30 | 37 |
| Yerzley Resilience (percent) | 25 | 66 | 77 | 76 | 75 | 77 | 77 | 76 | 75 |
| Mooney scorch, Min. for 10 point rise above minimum value (121° C.) | | | 45+ | 11 | 27 | 23 | 25 | 32 | 32 | 27 |

[1] Equal to ethylene thiourea in test at 70° C. for 22 hours.

Table I illustrates that various phenolic Mannich bases produce a state of cure equivalent to that from ethylene thiourea. However, an outstanding advantage obtained with these phenolic Mannich bases is the large increase in processing safety as evidenced by the Mooney scorch values.

*Example 2*

The following ingredients were used in compounding:

| | Parts |
|---|---|
| Polychloroprene (as in Ex. 1) | 100 |
| Semi-reinforcing furnace carbon black | 30 |
| Extra light calcined magnesia | 4 |
| Zinc oxide | 5 |
| Accelerator | [1] 1 |

[1] Unless otherwise indicated in the following tables.

Small ring specimens were cured and then tested in water at 25° C. by means of the Williams tensile machine [see Williams and Sturgis, Ind. Eng. Chem., 31, 1303 (1939)]. The "scorchiness" of the raw stock was determined by a mill scorch test. In this test 24 grams of compounded raw stock is milled on a 2" x 6" mill held at 135° C. with an opening of 0.016 inch. The end point of the test occurs at that time when the stock for at least one-half the roll width becomes lacy and refuses to band. This is known as the "scorch time." The longer the scorch time, the less scorchy is the stock. "Delta Mill Scorch" is the difference in minutes between the mill scorch time of an accelerated stock and that of a corresponding unaccelerated stock. A positive value indicates an increase in minutes in safety over the time required for the unaccelerated control.

Reference data for the compounds tested by this method are provided in Tables II to IX.

TABLE II

| Accelerator (Parts) | Stress in p. s. i. at 300% Elongation, Cure at 153° C. | | Delta Mill Scorch |
|---|---|---|---|
| | 20 Min. | 40 Min. | |
| None | 1,250 | 1,400 | 0 |
| Ethylene thiourea (0.5) | 2,500 | 3,150 | −5 |
| 2,4 - di (dimethylaminomethyl) - 6 - methylphenol (1.0) | 2,130 | 3,180 | +3 |

Table III shows data for substituted 2,4,6-tri(dimethylaminomethyl) phenols. See Table II for control.

TABLE III

| Substituent | Stress in p. s. i. at 300% Elongation, Cure at 153° C. | | Delta Mill Scorch |
|---|---|---|---|
| | 20 Min. | 40 Min. | |
| 3-methyl | 2,160 | 2,730 | +20 |
| 3-ethyl | 2,220 | 2,270 | +14+ |
| 3,5-dimethyl | 1,680 | 2,270 | +14+ |

Table IV shows data for substituted 2,6-di(dimethylaminomethyl) phenols. See Table II for control.

TABLE IV

| Substituent | Stress in p. s. i. at 300% Elongation, Cure at 153° C. | | Delta Mill Scorch |
|---|---|---|---|
| | 20 Min. | 40 Min. | |
| 4-methyl | 1,110 | 2,610 | +12+ |
| 4-t-butyl | 1,140 | 2,270 | +33 |
| 4-t-amyl | 1,820 | 2,670 | +26 |
| 4-octyl | 1,050 | 1,700 | +16 |
| 4-phenyl | 1,140 | 2,020 | +20+ |
| 4-butoxy | 1,310 | 2,410 | +16+ |
| 4-benzyloxy | 910 | 1,990 | +35 |
| 4-n-butylamino | 1,700 | 2,560 | +13 |
| 4-acetamido | 1,220 | 2,160 | +19+ |
| 4-morpholino | 940 | 2,440 | +24 |
| 3,4-dimethyl | 1,700 | 2,840 | +13 |

Table V shows data for substituted 2-dimethylaminomethyl phenols.

TABLE V

| Substituent | Stress in p. s. i. at 300% Elongation, Cure at 153° C. | | Delta Mill Scorch |
|---|---|---|---|
| | 20 Min. | 40 Min. | |
| None | 1,620 | 1,730 | +3 |
| 4-methyl | 1,310 | 1,820 | +2 |
| 4-octyl | 1,220 | 1,970 | +14 |
| 6-methyl | 1,110 | 1,900 | +4 |
| 4-nitro | 1,650 | 2,270 | −5 |
| 4-amino | 2,410 | 3,000 | −8 |
| 4-n-butylamino | 2,220 | 2,810 | −3 |

Table VI contains additional examples. See Table V for control.

TABLE VI

| Accelerator | Stress in p. s. i. at 300% Elongation, Cure at 153° C. | | Delta Mill Scorch |
|---|---|---|---|
| | 20 Min. | 40 Min. | |
| 2,2-di[3',5'-di(dimethylaminomethyl)-4'-hydroxyphenyl] propane | 1,790 | 2,870 | +21 |
| 2,5-di(dimethylaminomethyl) hydroquinone | 1,650 | 3,040 | +10 |
| 4 (or 6) - dimethylaminomethyl - 3 - methylphenol | 1,480 | 2,190 | +5+ |
| 4 - dimethylaminomethyl - 2 - methyl-6-chlorophenol | 1,730 | 1,360 | +6 |

Mannich bases from resorcinol were prepared by reaction with varying proportions of formaldehyde and dimethylamine. An example of such a preparation is presented in Table VII. This resorcinol Mannich base was obtained by reaction of resorcinol, formaldehyde and dimethylamine in the ratio 0.4/0.88/0.88 at 25° to 30° C. for three hours. The product was isolated by ether extraction.

TABLE VII

| Accelerator (Parts) | Stress in p. s. i. at 300% Elongation, Cure at 153° C. | | Mill Scorch in Minutes at 121° C. |
|---|---|---|---|
| | 20 Min. | 40 Min. | |
| Unaccelerated | 1,250 | 1,400 | 88 |
| Resorcinol Mannich base (1.0) | 2,330 | 3,010 | 69 |
| Ethylene thiourea (0.5) | 2,500 | 3,150 | 44 |

Test results for Mannich bases derived from naphthols are given in Table VIII. See Table VII for control.

TABLE VIII

| Accelerator | Stress in p. s. i. at 300% Elongation, Cure at 153° C. | | Delta Mill Scorch |
|---|---|---|---|
| | 20 Min. | 40 Min. | |
| 1-dimethylaminomethyl-2-naphthol | 1,620 | 2,160 | −2 |
| 2-dimethylaminomethyl-1-naphthol | 1,390 | 1,990 | −6 |

Metal derivatives of phenolic Mannich bases produce a high state of cure while retaining good safety. Results of tests with the sodium, magnesium and aluminum derivatives of 2,4-di(dimethylaminomethyl)-6-methyl phenol are shown in Table IX. See Table II for control.

TABLE IX

| Metal Derivative of 2,4-di(dimethylaminomethyl)-6-methyl phenol | Stress in p. s. i. at 300% Elongation, Cure at 153° C. | | Delta Mill Scorch |
|---|---|---|---|
| | 20 Min. | 40 Min. | |
| Sodium | 1,970 | 2,730 | +18+ |
| Magnesium | 1,900 | 2,980 | +6 |
| Aluminum | 2,330 | 2,390 | +3 |

*Example 3*

The vulcanization of a polychloroprene gum stock with 2,4 - di(dimethylaminomethyl) - 6 - methyl phenol was carried out with the following formulation:

|   | Parts |
|---|---|
| Polychloroprene (as in Ex. 1) | 100 |
| Phenyl-alpha-naphthylamine | 2 |
| Extra light calcined magnesia | 2 |
| Zinc oxide | 5 |
| Accelerator, as shown. | |

Test results are summarized in Table X. Slabs and pellets were cured and tested by standard A. S. T. M. methods.

TABLE X

| | Min. Cure at 153° C. | Ethylene Thiourea (0.5) | 2,4-di (dimethylaminomethyl)-6-methylphenol (1.0) |
|---|---|---|---|
| Stress in p. s. i. at 600% elongation | 10 | 1,160 | 900 |
| | 40 | 1,725 | 1,900 |
| Tensile strength in p. s. i. | 10 | 2,800 | 3,025 |
| | 40 | 2,600 | 3,325 |
| Percent Compression Set (70 hrs. at 100° C.) | 25 | 35 | 27 |
| Yerzley resilience (percent) | 25 | 81 | 80 |
| Mooney Scorch, Min. for 10 point rise above minimum value (121° C.) | | 13 | 36 |

*Example 4*

The vulcanization of a polychloroprene clay stock with 2,4 - di(dimethylaminomethyl) - 6 - methyl phenol was carried out with the following formulation:

|   | Parts |
|---|---|
| Polychloroprene (as in Ex. 1) | 100 |
| Phenyl-alpha-naphthylamine | 2 |
| Crown clay | 29 |
| Extra light calcined magnesia | 2 |
| Zinc oxide | 5 |
| Accelerator, as shown. | |

Test results are summarized in Table XI. Slabs and pellets were cured and tested by standard A. S. T. M. methods.

TABLE XI

| | Min. Cure at 153° C. | Ethylene Thiourea (0.5) | 2,4-di (dimethylaminomethyl)-6-methylphenol (1.0) |
|---|---|---|---|
| Stress in p. s. i. at 600% elongation | 20 | 1,775 | 1,950 |
| | 40 | 1,975 | 2,250 |
| Tensile strength in p. s. i. | 20 | 3,750 | 4,075 |
| | 40 | 3,825 | 4,100 |
| Percent Compression Set (70 hrs. at 100° C.) | 25 | 41 | 40 |
| Yerzley resilience (percent) | 25 | 79 | 76 |
| Mooney scorch, min. for 10 point rise above minimum value (121° C.) | | 13 | 47 |

Example 5

Polychloroprene prepared by the process of U. S. Patent 2,234,215, using tetramethyl thiuram disulfide, was compounded according to the following formula. Slabs and pellets of the polymer were cured and tested by standard A. S. T. M. methods. The testing results are shown in Table XII.

|  | Parts |
|---|---|
| Polychloroprene | 100 |
| Phenyl-beta-naphthylamine | 1 |
| Stearic acid | 0.5 |
| Extra light calcined magnesia | 4 |
| Semi-reinforcing furnace carbon black | 29 |
| Zinc oxide | 5 |
| Accelerator (as listed in Table XII) | 0.5 |

TABLE XII

|  | Min. Cure at 153° C. | No Accelerator | Ethylene Thiourea | 2,4-di(dimethyl-aminomethyl)-6-methyl phenol |
|---|---|---|---|---|
| Stress in p. s. i. at 300% elongation | 15 | 1,475 | 1,825 | 1,675 |
|  | 30 | 1,675 | 2,000 | 1,875 |
|  | 60 | 1,800 | 2,200 | 1,875 |
| Tensile strength in p. s. i. | 15 | 3,225 | 3,225 | 3,300 |
|  | 30 | 3,250 | 3,325 | 3,575 |
|  | 60 | 3,400 | 3,275 | 3,400 |
| Percent Compression Set (70 hrs. at 70° C.) | 20 | 61 | 48 | 49 |
| Yerzley Resilience (percent) | 20 | 73.5 | 76.0 | 75.4 |
| Mooney scorch; min. for 10 point rise above minimum value (121° C.) |  | 29 | 17 | 23 |

The present invention is applicable to the vulcanization of all types of compounded neoprene, which may contain various antioxidants, fillers, extenders, reinforcing agents, coloring materials, peptizing agents, other vulcanization accelerators, sulfur, and the like. The neoprene may be used either in solid form or as a solution (cement) or aqueous dispersion (latex).

I claim:

1. The process of vulcanizing chloroprene polymers which comprises incorporating in the chloroprene polymer stock, containing at least 1% of zinc oxide, from 0.5% to 3.0% of a Mannich base of the group consisting of phenols and naphthols containing from one to three dimethylaminomethyl groups, and heating at vulcanizing temperatures to effect curing of the polymer.

2. The process of vulcanizing chloroprene polymers which comprises incorporating in the chloroprene polymer stock, containing at least 1% of zinc oxide, from 0.5% to 3.0% of 2,4-di(dimethylaminomethyl)-6-methyl phenol, and heating at vulcanizing temperatures to effect curing of the polymer.

3. The process of vulcanizing chloroprene polymers which comprises incorporating in the chloroprene polymer stock, containing at least 1% of zinc oxide, from 0.5% to 3.0% of 2,4,6-tri(dimethylaminomethyl) phenol, and heating at vulcanizing temperatures to effect curing of the polymer.

4. An unvulcanized chloroprene polymer which can be rapidly cured at ordinary vulcanizing temperatures, containing from 0.5% to 3.0% of a Mannich base of the group consisting of phenols and naphthols containing from one to three dimethylaminomethyl groups.

5. An unvulcanized chloroprene polymer which can be rapidly cured at ordinary vulcanizing temperatures, containing from 0.5% to 3.0% of 2,4-di(dimethylaminomethyl)-6-methyl phenol.

6. An unvulcanized chloroprene polymer which can be rapidly cured at ordinary vulcanizing temperatures, containing from 0.5% to 3.0% of 2,4,6-tri(dimethylaminomethyl) phenol.

JOHN J. VERBANC.

References Cited in the file of this patent

UNITED STATES PATENTS

| Number | Name | Date |
|---|---|---|
| 2,117,591 | Alexander | May 17, 1938 |